(12) United States Patent
Denecheau et al.

(10) Patent No.: US 9,185,041 B2
(45) Date of Patent: Nov. 10, 2015

(54) LOAD BALANCING TRAFFIC IN A MPLS NETWORK

(71) Applicant: International Business Machines Corporation, Armonk, NY (US)

(72) Inventors: Lionel Denecheau, La Colle sur Loup (FR); Ludovic Hazard, Tourrettes sur Loup (FR); Stephen Sauer, La Defense (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/089,983

(22) Filed: Nov. 26, 2013

(65) Prior Publication Data

US 2014/0086055 A1    Mar. 27, 2014

Related U.S. Application Data

(63) Continuation of application No. 12/872,021, filed on Aug. 31, 2010, now abandoned.

(51) Int. Cl.
| | |
|---|---|
| *H04L 12/66* | (2006.01) |
| *H04L 12/803* | (2013.01) |
| *H04L 12/701* | (2013.01) |
| *H04L 12/729* | (2013.01) |
| *H04L 12/723* | (2013.01) |
| *H04L 12/24* | (2006.01) |

(52) U.S. Cl.
CPC .............. *H04L 47/125* (2013.01); *H04L 45/00* (2013.01); *H04L 45/125* (2013.01); *H04L 45/50* (2013.01); *H04L 41/5003* (2013.01)

(58) Field of Classification Search
None
See application file for complete search history.

(56) References Cited

U.S. PATENT DOCUMENTS

| | | | |
|---|---|---|---|
| 6,976,087 B1 | 12/2005 | Westfall et al. | |
| 7,035,938 B2 | 4/2006 | Lau | |
| 7,136,357 B2 | 11/2006 | Soumiya et al. | |
| 7,336,613 B2 | 2/2008 | Lloyd et al. | |
| 7,477,657 B1 * | 1/2009 | Murphy et al. | 370/468 |
| 7,983,163 B2 | 7/2011 | Denecheau et al. | |
| 2003/0058797 A1 | 3/2003 | Izmailov et al. | |
| 2006/0133300 A1 | 6/2006 | Lee et al. | |
| 2007/0133433 A1 | 6/2007 | Nam et al. | |
| 2007/0133559 A1 * | 6/2007 | Ko et al. | 370/395.21 |
| 2008/0031146 A1 | 2/2008 | Kwak et al. | |
| 2008/0089347 A1 | 4/2008 | Phillipi et al. | |
| 2008/0186852 A1 * | 8/2008 | Sami et al. | 370/235 |

(Continued)

FOREIGN PATENT DOCUMENTS

WO    WO03058868 A2    7/2003

OTHER PUBLICATIONS

U.S. Appl. No. 12/342,257, Filing Date Dec. 23, 2008, First Named Inventor: Lionel Denecheau; Confirmation No. 2360.

(Continued)

*Primary Examiner* — Kevin C Harper
(74) *Attorney, Agent, or Firm* — Schmeiser, Olsen & Watts, LLP; John Pivnichny

(57) ABSTRACT

A method and system for managing traffic in a network. Label switch paths are identified. Each label switch path begins at a first provider edge and ends at a second provider edge. For each label switch path, logical paths are identified. Most recent data received from the first provider edge is transmitted to the second provider edge via a selected logical path.

17 Claims, 7 Drawing Sheets

(56) References Cited

U.S. PATENT DOCUMENTS

| | | | |
|---|---|---|---|
| 2010/0142366 A1 | 6/2010 | Bugenhagen | |
| 2010/0149979 A1 | 6/2010 | Denecheau et al. | |
| 2010/0214913 A1* | 8/2010 | Kompella | 370/230 |

OTHER PUBLICATIONS

Notice of Allowance (Mail Date Mar. 9, 2011) for U.S. Appl. No. 12/342,257—Filing Date Dec. 23, 2008; Confirmation No. 2360.

Notice of Allowance (Mail Date Sep. 19, 2013) for U.S. Appl. No. 12/872,021, Filing Date Aug. 30, 2010; Confirmation No. 2787.

Office Action (Mail Date Jun. 3, 2013) for U.S. Appl. No. 12/872,021, Filing Date Aug. 30, 2010; Confirmation No. 2787.

Response (Aug. 30, 2013) for U.S. Appl. No. 12/872,021, Filing Date Aug. 30, 2010; Confirmation No. 2787.

RCE (Nov. 6, 2013) for U.S. Appl. No. 12/872,021, Filing Date Aug. 30, 2010; Confirmation No. 2787.

Notice of Allowance (Mail Date Nov. 27, 2013) for U.S. Appl. No. 12/872,021, Filing Date Aug. 30, 2010; Confirmation No. 2787.

* cited by examiner

LOAD BALANCING TRAFFIC IN A MPLS NETWORK

This application is a continuation application claiming priority to Ser. No. 12/872,021, filed Aug. 31, 2010, now Abandoned.

FIELD OF THE INVENTION

The present invention relates generally to network traffic and more particularly to a system and method for load balancing traffic in MultiProtocol Label Switching (MPLS) networks.

BACKGROUND OF THE INVENTION

Servers supporting mission-critical applications (i.e. financial transactions, database access, corporate intranets, etc.) must exchange traffic across data networks. Moreover, additional time sensitive applications (i.e. Voice over IP, Video) need to be carried across networks. Additionally, networks need the ability to scale performance to handle large numbers of end user requests without creating unwanted delays.

Network load balancing distributes traffic to multiple paths inside the network, each path going across different network equipment (Routers). Network load balancing transparently partitions the end user requests among the network paths.

Currently, the network routing protocols send traffic according to the shortest path between the end user and the application. Usually, the shortest path is determined based on static criteria such as least number of intermediate devices in the path (less hops), or larger capacity links (in terms of bandwidth). As the number of end users utilizing an application increases, the shortest path becomes congested.

MultiProtocol Label Switching (MPLS) refers to a mechanism which directs and transfers data between Wide Area Networks (WANs) nodes with high performance, regardless of the content of the data. MPLS belongs to the family of packet-switched networks. MPLS makes it easy to create "virtual links" between nodes on the network, regardless of the protocol of their encapsulated data. It can be used to carry many different kinds of traffic, including IP packets, as well as native ATM, SONET, and Ethernet frames. It is a highly scalable, protocol independent, data-carrying mechanism. Packet-forwarding decisions are made solely on the contents of the labels, without the need to examine the packet.

This allows one to create end-to-end circuits across any type of transport medium, using any protocol. The primary benefit is to eliminate dependence on a particular Data Link Layer technology, such as ATM, frame relay, SONET or Ethernet, and eliminate the need for multiple Layer 2 networks to satisfy different types of traffic. MPLS operates at an OSI Model layer that is generally considered to lie between traditional definitions of Layer 2 (Data Link Layer) and Layer 3 (Network Layer), and thus is often referred to as a "Layer 2.5" protocol. It was designed to provide a unified data-carrying service for both circuit-based clients and packet-switching clients which provide a datagram service model.

In MultiProtocol Label Switching networks, each service provider defines his own specific Quality of Service 'QOS' policy over its MPLS backbone. The mapping between the nature of traffic (real-time voice over IP, video streaming, http transactional, unidirectional, connection oriented, connection less) and the QOS policies of each service provider depends on the service provider QOS policy and is statically configured on each backbone edge router.

A drawback of such mapping is that it static and cannot be adjusted automatically on the service provider backbone usage and/or for any QOS policy modifications, thereby causing congestion.

Moreover, the real time and on-demand solutions massively deployed today at end user sites may conduct that a QOS policy provided by a service provider be considered rapidly obsolete.

The present invention solves the aforementioned problems.

SUMMARY OF THE INVENTION

The present invention provides a method for managing traffic in a network and an associated computer program product, computer system, and process for supporting computer infrastructure. The method comprises:

identifying I label switch paths $P_i$ (i=1, 2, ..., I), each label switch path $P_i$ beginning at a first provider edge and ending at a second provider edge, wherein the first provider edge and the second provider edge each reside in the network, and wherein I is a total number of paths in the network such that I is a positive integer of at least 2;

for each label switch path $P_i$ (i=1, 2, ..., I), identifying J logical paths $LP_{i,j}$ (j=1, 2, ..., J), wherein $J=2^N$ such that N is a positive integer of at least 2, and wherein said J logical paths for the I label switch paths consist of K logical paths such that K=I*J;

for each logical path $LP_{i,j}$ (i=1, 2, ..., I and j=1, 2, ..., J), identifying jitter $J_{i,j}$ and packet delay $D_{i,j}$ and packet loss $L_{i,j}$;

for each logical path $LP_{i,j}$ (i=1, 2, ..., I and j=1, 2, ..., J), calculating a path usage $U_{i,j}$ as a first function of said $J_{i,j}$ and said $D_{i,j}$ and said $L_{i,j}$, wherein $U_{i,j}$ is a fraction denoting a highest percentage of total network traffic that logical path $LP_{i,j}$ can manage;

said first provider edge receiving most recent data; and transmitting said received most recent data from the first provider edge to the second provider edge via a selected logical path of the K logical path such that the selected logical path comprises a highest path usage for which said transmitting said received most recent data does not result in the selected logical path managing a higher percentage of network traffic than is dictated by said highest usage value comprised by said selected logical path.

DETAILED DESCRIPTION OF THE INVENTION

The present invention provides a system and a method for automatically adapting the load sharing in a MPLS network.

The present invention provides a system and method for load sharing traffic across all transmission paths.

The present invention measures the real time application requirements (delay to reach the destination, loss of packets, jitter) of each service provider QOS policy to adapt the load sharing.

The present invention allows adapting the load sharing to modifications or adjustments of the service provider QOS policies.

In one embodiment, there is provided a method for load balancing traffic between a first provider edge and a second provider edge in a MPLS network. The first provider edge is coupled to the second provider edge through a plurality of transmission paths and the method comprises the steps of:

for each transmission path:
defining a group of logical paths, each logical path being identified by a field value within the header of a data packet to be transmitted;
measuring a set of traffic parameters for each logical path; and
calculating a logical path usage value for each logical path from the measurement step;
scoring the logical path usage values of the plurality of transmission paths; and
selecting one or several transmission paths associated to the one or several logical paths having the highest score to send traffic.

Embodiments of the invention are described herein after by way of examples with reference to the accompanying Figures and drawings, using the following definitions of the terms: 'provider edge', 'jitter', 'packet loss', and 'packet delay'.

The term 'provider edge' as defined herein refers to a network hardware device situated between one network service provider's area and areas administered by other network providers.

The term 'jitter' as defined herein refers to unwanted variation of one or more characteristics of a periodic signal in electronics and telecommunications. Jitter may be seen in characteristics such as the interval between successive pulses, or the amplitude, frequency, or phase of successive cycles.

The term 'packet loss' as defined herein refers to the situation where one or more packets of data traveling across a computer network fail to reach their destination. Packet loss can be caused by a number of factors, including signal degradation over the network medium or over saturated network links, corrupted packets rejected in-transit, faulty networking hardware, maligned system drivers or network applications, normal routing routines, etc.

The term 'packet delay' and/or 'latency' as defined herein refers to the period of time necessary for a packet of data to travel from one designated point to another. One-way Latency is measured by sending a packet of data across the network and by comparing the time the packet was sent with the time the packet was received, assuming both sending and receiving devices have their clock synchronized using a Network Time Protocol.

Figure 1:
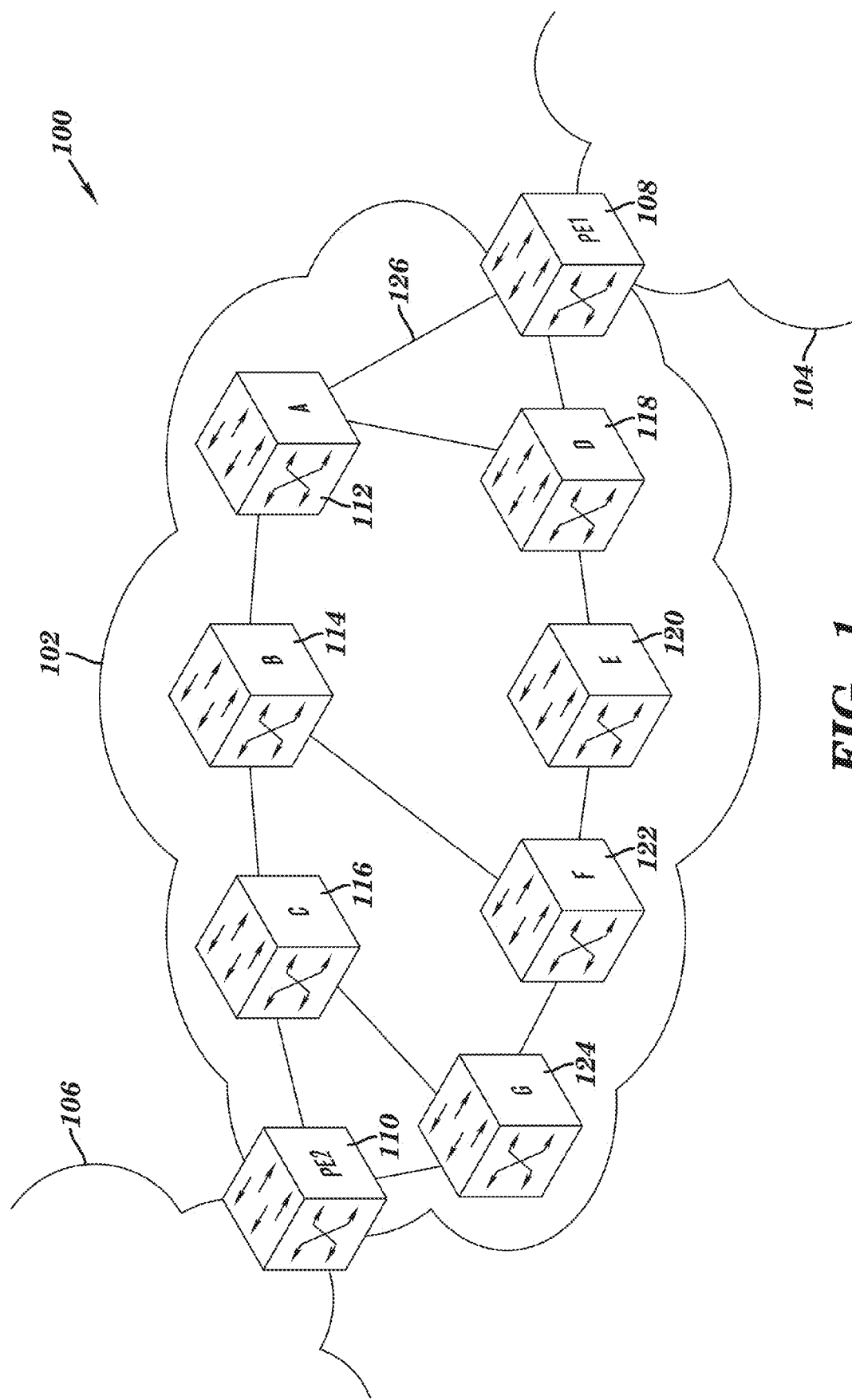
FIG. 1 illustrates an environment of a MPLS network, in accordance with embodiments of the present invention.

FIG. 1 illustrates a MPLS network environment 100, in accordance with embodiments of the present invention. The MPLS network environment 100 comprises a first network 102 connected to both a second network 104 and a third network 106. The first network 102 comprises a first provider edge (PE1) 108 connecting the first network 102 with the second network 104. The first network 102 also comprises a second provider edge (PE2) 110 connecting the first network 102 with the third network 106. It is understood that while FIG. 1 illustrates the first network 102 comprising two provider edges (PE1 108 and PE2 110), the first network 102 may comprise a number of provider edges ranging from one to infinity.

Moreover, the first network 102 comprises a plurality of network hardware devices 112 through 124 interconnected via transmission paths 126, generally named Label Switch Paths 'LSP' being, inter alia, Ethernet cables, fiber optic cables, radio-wave signals, satellite signals, etc.

Between the first provider edge 108 and the second provider edge 110, there is a plurality of paths (Label Switch Path 'LSP') through which information may be sent. For example, with respect to FIG. 1, one LSP from PE1 108 to PE2 110 may travel along devices A 112, B 114, and C 116. A first alternative LSP from PE1 108 to PE2 110 may be through devices D 118, E 120, F 122, and G 124. A second alternative LSP from PE1 108 to PE2 110 may be through devices D 118, A 112, B 114, F 122, G 124, and C 116.

In a MPLS network, the LSP is selected at the ingress edge by a Label Edge Router (LER) and is based on a Service Level measure, known as IP SLA. So, there is one IP SLA associated to one LSP. Then, using a Label Distribution Protocol (LDP), the LER distributes to Label Switched Routers (LSRs) the individual link selections that comprise the end-to-end path selection. The LER inserts labels into the headers of the individual packets in the flow. As the LSRs receive the packets, they examine the short labels, compare them against a label database, switch the existing label for a new one, and quickly forward the packet across an appropriate link to the next LER. The process is repeated by each LSR until the packet reaches the egress LER, which strips the tag away as the packet exits the network.

Each LSP from PE1 108 to PE2 110 has its own values for jitter, packet loss, and packet delay. As already discussed, conventional network load sharing methods simply look to the shortest path (i.e. least amount of hardware) between PE1 108 and PE2 110. However, as this 'shortest' path receives all the traffic, it may experience jitter, packet loss, and packet delay.

Figure 2:
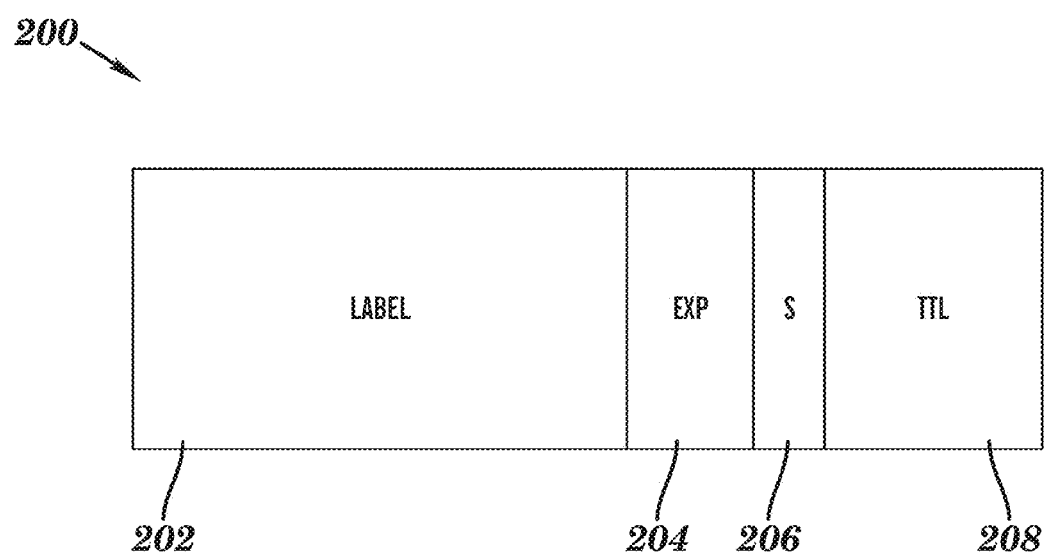
FIG. 2 shows a header of a MPLS data packet, in accordance with embodiments of the present invention.

FIG. 2 shows a header of a MPLS data packet, in accordance with embodiments of the present invention. In a MPLS network, data packets are assigned labels at the ingress edge PE 1 when entering the MPLS network. Data packets are prefixed with a MPLS header such as the header 200 shown of FIG. 2, containing one or more 'labels'. Each label entry contains four fields:

a 'Label' field 202 made of 20-bits;
an 'EXP' field 204 made of 3-bits for containing class of service information;
a 'S' field 206 made of 1-bit. When S is set, the current label is the last in the stack;
a 'TTL' field 208 made of 8-bits for containing a time to live indicator.

The EXP field 204 is used in the MPLS label to infer the Class of Service for a particular traffic. When measuring the IP SLA for a specific LSP, the EXP value is fixed and there is one EXP value associated to one LSP.

With the 3 bits available in the EXP label field, the MPLS label is used in the present invention to define eight logical transmission paths, as Table 1 shows in the breakdown of bits:

TABLE 1

| EXP bits value | Logical Path |
| --- | --- |
| 000 | 0 |
| 001 | 1 |
| 010 | 2 |
| 011 | 3 |
| 100 | 4 |
| 101 | 5 |
| 110 | 6 |
| 111 | 7 |

Figure 3:
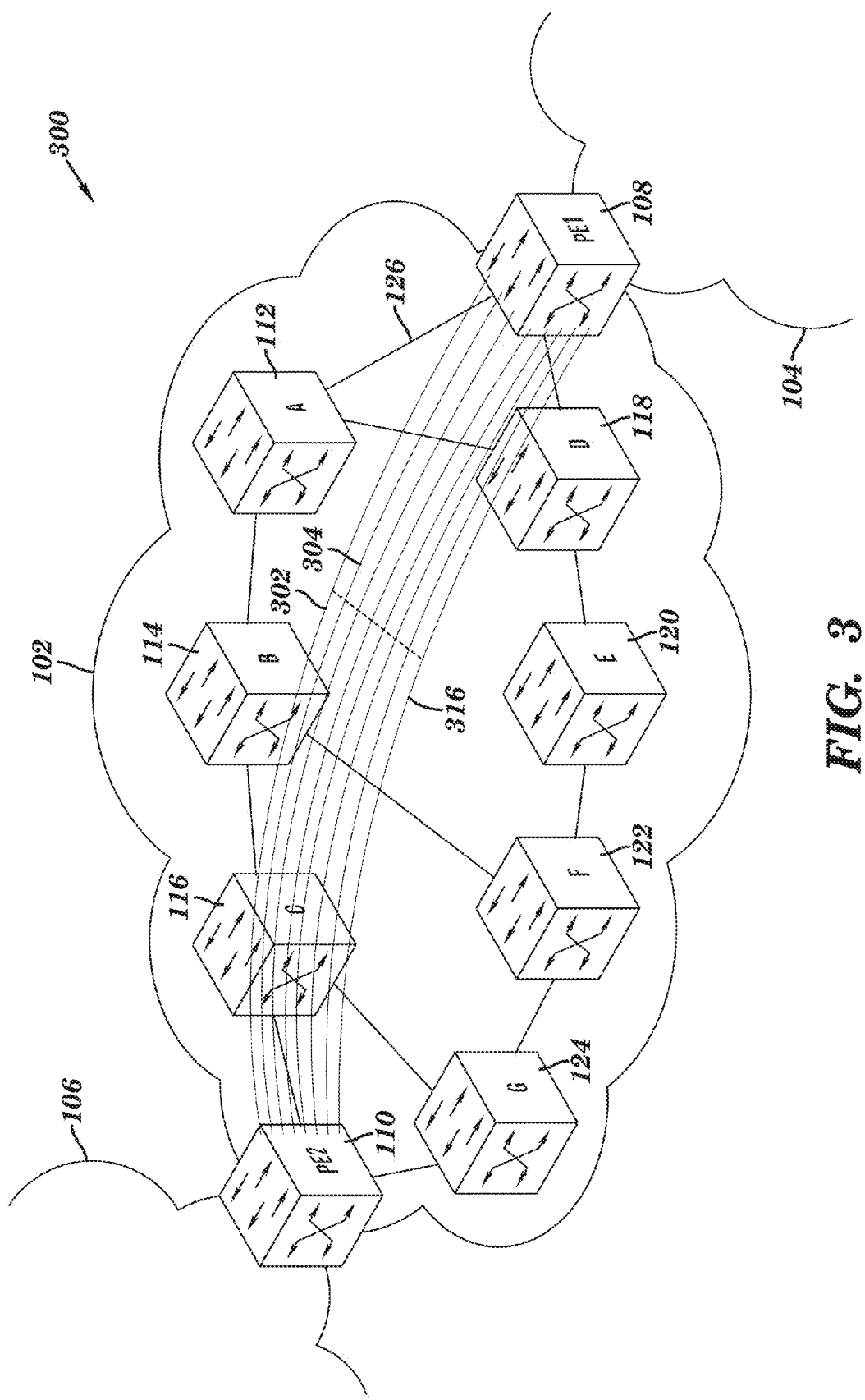
FIG. 3 illustrates an environment in which a method for an adaptive load sharing to balance network traffic may be implemented, in accordance with embodiments of the present invention.

FIG. 3 illustrates an environment in which a method for an adaptive load sharing to balance network traffic may be implemented, in accordance with embodiments of the present invention With reference to FIG. 3, an example of eight logical paths for one LSP is shown in a MPLS network 300 of the type as previously described with reference to FIG. 1. At the ingress edge, the provider edge PE1 108 enables and manages eight logical paths (302, 304, . . . , 316), namely one logical path per EXP value.

It has to be appreciated that such eight logical paths are defined for each LSP existing from the ingress edge, such as the LSPs described for FIG. 1: LSP__1 from PE1 108 to PE2 110 that through devices A 112, B 114, and C 116, and LSP__2 through devices D 118, E 120, F 122, and G 124, and LSP__3 through devices D 118, A 112, B 114, F 122, G 124, and C 116.

In operation, 8 IP SLAs are sent from the provider edge PE1, one per EXP value, for each LSP, in order to get the traffic conditions of the delay, jitter and packet loss measured unidirectionally from PE1 to PE2.

At the egress edge, upon reception of an IP SLA, PE2 computes the SLA required parameters and replies to PE1 by time stamping the current IP SLA traffic. The corresponding logical path is then assigned with a traffic condition value.

Each of the eight logical paths of a LSP is similarly assigned with a traffic condition value.

Once all logical paths for all LSPs are tested, the ingress PE 1 gets, in real time all the IP SLAs time stamping.

Each pair of (LSP, EXP) gets a scoring of acceptable percentage of traffic, and the router of ingress PE1 marks the EXP field of incoming data packets with an appropriate (LSP, EXP) bit values to allow routing of the data packet to the assigned LSP. The data packets are then distributed on the LSPs according to the respective percentage. Provider edge PE1 is thus able to select which IP packets to be sent on which LSP depending on the IP SLA statistics of each possible path. If the IP SLA statistics change, the load-sharing algorithm adjusts the load sharing across all new identified possible paths.

To exemplify, consider the following illustrative example ("Example A"). If 2 LSPs among the three identified are selected, LSP__1 and LSP__2, the final load sharing among the eight logical paths of LSP__1 and the eight logical paths of LSP__2 may give the following statistical distribution, wherein the logical path LSP__1 having the EXP field set to 7 being the optimal route for receiving 15% of the total traffic:

on LSP__1, with EXP set to 0: 5% of the total traffic;
on LSP__1, with EXP set to 1: 2% of the total traffic;
on LSP__1, with EXP set to 2: 7% of the total traffic;
on LSP__1, with EXP set to 3: 10% of the total traffic;
on LSP__1, with EXP set to 4: 6% of the total traffic;
on LSP__1, with EXP set to 5: 5% of the total traffic;
on LSP__1, with EXP set to 6: 5% of the total traffic;
on LSP__1, with EXP set to 7: 15% of the total traffic;
on LSP__2, with EXP set to 0: 5% of the total traffic;
on LSP__2, with EXP set to 1: 5% of the total traffic;
on LSP__2, with EXP set to 2: 4% of the total traffic;
on LSP__2, with EXP set to 3: 12% of the total traffic;
on LSP__2, with EXP set to 4: 5% of the total traffic;
on LSP__2, with EXP set to 5: 5% of the total traffic;
on LSP__2, with EXP set to 6: 5% of the total traffic;
on LSP__2, with EXP set to 7: 4% of the total traffic.

The calculation of LSP IP SLA per EXP may be performed at regular intervals. In one implementation, the interval is set to a minimum of 3 minutes, to allow a smooth adaptation of the load sharing.

In an alternate embodiment, traffic requirements of the current application originating the traffic are used to select the best match transmission path. Based on the traffic condition values collected as previously described, and according to the application traffic requirements (i.e., threshold values in term of delay to reach the destination, number of loss packets, jitter) a computation is then made at PE1 to identify if and how LSP(s) are having acceptable SLAs values conforming to the application traffic requirements.

The application traffic requirements are available from a centralized database which stores various traffic requirements by application. The database may be updated on a regular basis.

If no LSP matches exactly the application traffic requirements, then the ingress PE1 may: (i) deliver a warning message to a terminal session, syslog servers, SNMP traps, and mail administrator; (ii) drop the traffic; or (iii) select the LSP having the most approaching SLA values compared to the traffic requirements.

If at least one LSP matches the application traffic requirements, then the load sharing among the logical paths of the selected LSP(s) is computed to share the traffic accordingly.

Figure 4:
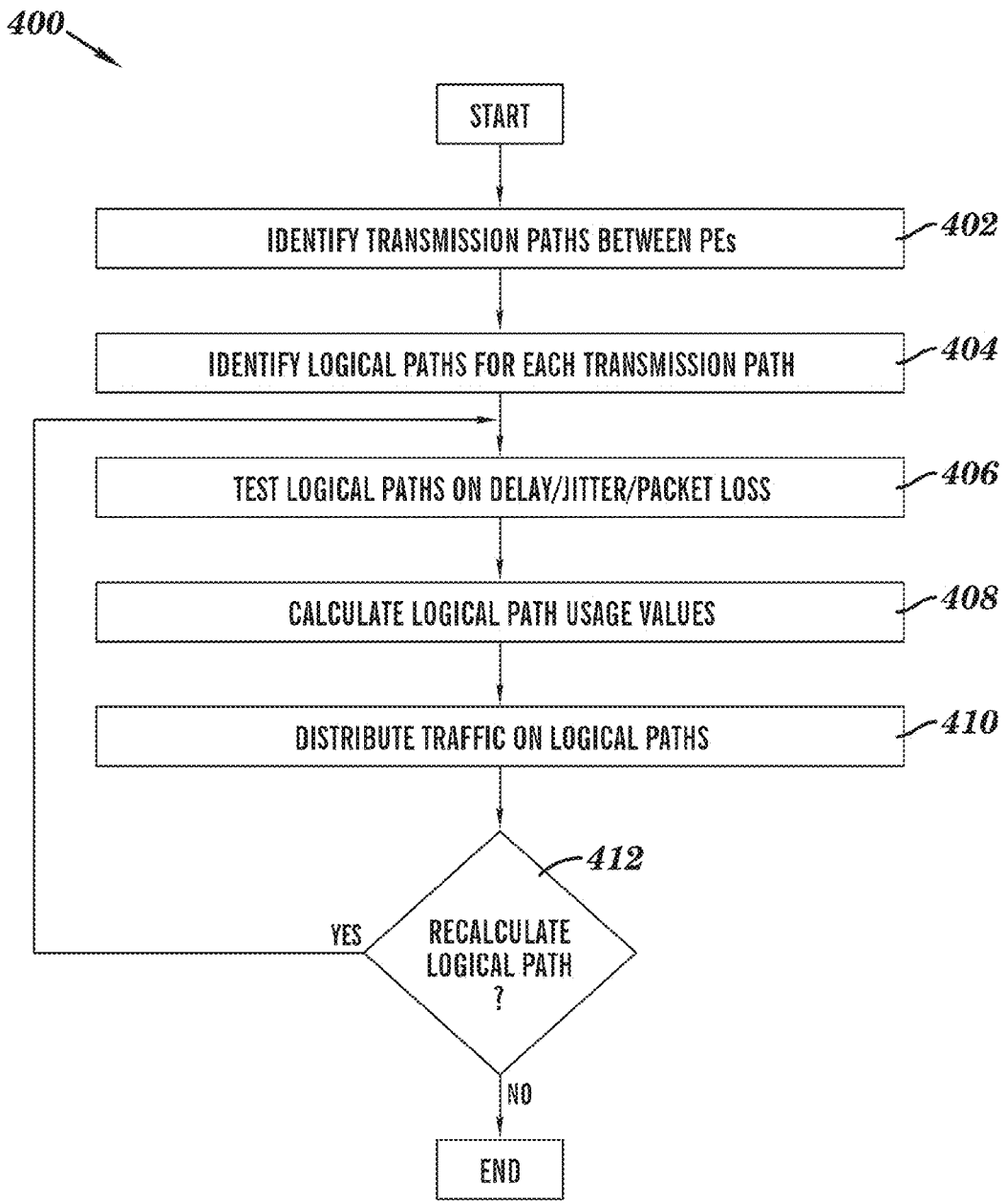
FIG. 4 shows a flow chart of a method to balance network traffic, in accordance with embodiments of the present invention.

FIG. 4 is a flow chart of a method 400 to balance network traffic, in accordance with embodiments of the present invention.

The method 400 begins with step 402 which comprises identifying all transmission paths LSP from the first provider edge PE1 108 to the second provider edge PE2 110 (see FIG. 1, supra). For ease of understanding, each path (LSP) is represented as $P_i$ indexed from i=1 to i=I, where I is a positive number greater than 1 and equal to the total number of paths from the first provider edge PE1 108 to the second provider edge PE2 110. Once each path from the first provider edge PE1 108 to the second provider edge PE2 110 is identified, the first provider edge PE1 108 stores $P_i$ for i=1, 2, . . . , I in a library (Label Information Database) residing within the first provider edge PE1 108.

After completion of step 402, the method continues with step 404 which allows identifying all logical paths LPs for each identified transmission path.

In next step 406, each logical path is tested to determine (i.e., ascertain) the packet delay, packet loss, and jitter parameters. For ease of understanding, each logical path of path (LSP) $P_i$ is represented as $LP_{i,j}$ indexed from i=1, 2, . . . , I and j=1 to j=J, where J is an integer equal to the number of possible combinations ($2^N$) derived from the number of bits (N) available in the EXP field of the MPLS data packet header (i.e., three bits with N=3 in the current MPLS networks leading to J=$2^3$, namely eight, logical paths as previously described). For each index i (i=1, 2, . . . , I), $LP_{i,j}$ corresponds to EXP=j−1 (j=1, 2, . . . , J). For example for each index i (i=1, 2, . . . , I) with N=3 and J=8, $LP_{i,1}$ corresponds to EXP=0, $LP_{i,2}$ corresponds to EXP=1, . . . , and $LP_{i,8}$ corresponds to EXP=7.

In one embodiment, the test includes the first provider edge PE1 108 sending artificial data through the first network 102 to the second provider edge PE2 110 for each $LP_{i,j}$. For each $LP_{i,j}$, the first provider edge PE1 108 records the packet delay $D_{i,j}$ in terms of milliseconds, the jitter $J_{i,j}$ in terms of milliseconds, and the packet loss $L_{i,j}$ in terms of losses per ten million (10 mm). Thereinafter, the first provider edge PE1 108 stores $D_{i,j}$, $J_{i,j}$, and $L_{i,j}$ in the library.

After completion of step 406, the method continues with step 408 which comprises calculating logical path usage values from the first provider edge PE1 108 to the second provider edge PE2 110.

In one embodiment of the present invention, step 408 first calculates an intermediate value called the path rate $R_{i,j}$ for i=1, 2, ..., I and j=1, 2, ..., J. The path rate $R_{i,j}$ is calculated utilizing $D_{i,j}$, $J_{i,j}$, and $L_{i,j}$ as well as three variables: a delay ratio (DN); a jitter ratio (JN); and a loss ratio (LN) which are integers having a value between zero (0) and one thousand twenty four (1024). The variables DN, JN, and LN may be provided as input by an end user at the first provider edge.

Specifically, $R_{i,j}$ is calculated according to a linear function of $J_{i,j}$ and $D_{i,j}$ and $L_{i,j}$. For example, $R_{i,j}=D_{i,j}*DN+J_{i,j}*JN+L_{i,j}*LN$ for i=1, 2, ..., I and j=1, 2, J, wherein DN, JN, and JN are used as proportionality constants for calculating $R_{i,j}$. In one embodiment, $R_{i,j}$ is calculated according to a non-linear function of $J_{i,j}$ and $D_{i,j}$ and $L_{i,j}$. After calculating $R_{i,j}$, step 408 calculates the weight per path $W_{i,j}$. The weight per path $W_{i,j}$ is calculated according to:

$$W_{i,j} = R_{i,j} \Big/ \sum_{i=1, j=1}^{I,J} R_{i,j}$$

for i=1, 2, ..., I, and j=1, 2, ... J. After calculating the weight per path $W_{i,j}$, step 408 calculates the credit per path $C_{i,j}$ for i=1, 2, ..., I and j=1, 2, ... J. The credit per path $C_{i,j}$ is calculated according to the function:

$$C_{i,j}=1/W_{i,j}$$

Finally after calculating the credit per path $C_{i,j}$, step 408 calculates the logical path usage $U_{i,j}$ for i=1, 2, ..., I and j=1, 2, ... J.

The logical path usage $U_{i,j}$ utilizes the path rate $R_{i,j}$, weight per path $W_{i,j}$, and credit per path $C_{i,j}$ and the resulting value derived will be used by the first provider edge PE1 108 to apportion the amount of traffic each logical path $LP_{i,j}$ can reasonably manage.

In one embodiment of the present invention, path usage $U_{i,j}$ is calculated according to the function $$U_{i,j} = C_{i,j} \Big/ \sum_{i=1, j=1}^{I,J} R_{i,j}$$

for i=1, 2, ..., I and j=1, 2, ... J. The resulting logical path usage $U_{i,j}$ is a fraction representing the highest percentage of total network traffic which a given logical path $LP_{i,j}$ can manage. After path usage $U_{i,j}$ is calculated for i=1, 2, ..., I, and j=1, 2, ... J, step 408 stores the path usage $U_{i,j}$ results in a library managed by the first provider edge PE1 108.

After completion of step 408, the method 400 continues with step 410 which comprises distributing data packets among the logical paths according to the calculated path usage $U_{i,j}$ values. In one embodiment of the present invention, when receiving data originating from the second network 104, the first provider edge PE1 108 will look to the path usage values $U_{i,j}$ for i=1, 2, ..., I and j=1, 2, J for the most appropriate logical path $LP_{i,j}$ to transmit the data across. As noted before, the path usage values $U_{i,j}$ represent the percentage of the network traffic a specific logical path $LP_{i,j}$ can handle/manage effectively.

In one embodiment of the present invention illustrated by Example A supra, step 410 identifies the path usage value $U_{i,j}$ having the largest value (15%) not exceeding the current network traffic. With selected LSPs of LSP_1 and LSP_2 in Example A, the logical path having the largest usage value $U_{i,j}$ (15%) is logical path $LP_{1,7}$ (i.e., LSP_1, EXP=7). Thus, step 410 would attempt to send the most recently received data from the first provider edge PE1 108 to the second provider edge PE2 110 via logical path $LP_{1,7}$. Step 410 would also determine if sending the most recently received data across the first network 102 via logical path $LP_{1,7}$ would translate into managing more than 15% of the overall network traffic (i.e., the maximum percentage value that may be handled based on $U_{1,7}$). If logical path $LP_{1,7}$ would end up managing more than 15% of the network traffic as a result of routing the most recently received data, then step 410 identifies the next largest path usage value $U_{1,7}$ of 12%, namely logical path $LP_{2,3}$ (i.e., LSP_2, EXP=3) in Example A. Therefore, step 410 would transmit the most recently received data from the first provider edge PE1 108 to the second provider edge PE2 110 via logical path $LP_{2,3}$. Thus, the logical path selected for transmitting the most recently received data from the first provider edge PE1 108 to the second provider edge PE2 110 is the logical path having the highest usage value $U_{i,j}$ such that said transmitting (from the first provider edge PE1 108 to the second provider edge PE2 110) does not result in the selected logical path managing a higher percentage of the network traffic than its usage value $U_{i,j}$.

Figure 5:
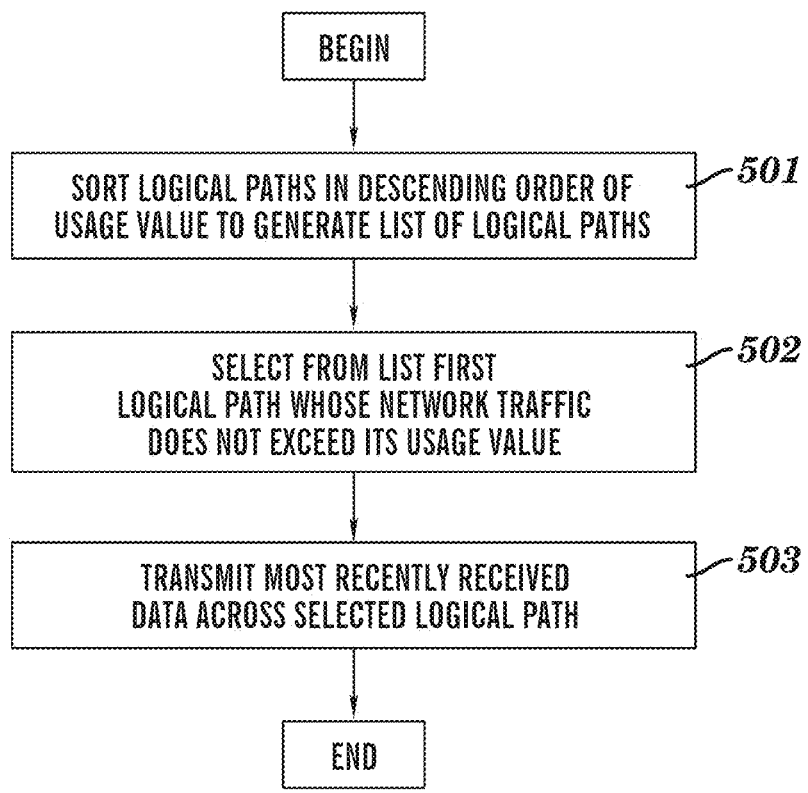
FIG. 5 is a flow chart describing a process for transmitting the most recently received data from a first provider edge to a second provider edge, in accordance with embodiments of the present invention.

FIG. 5 is a flow chart describing a process for transmitting the most recently received data from the first provider edge PE1 108 to the second provider edge PE2, in accordance with embodiments of the present invention. The process of FIG. 5 comprises steps 501-503.

Step 501 sorts the logical paths of the selected LSPs to generate a list of the logical paths in descending order of usage value (i.e., in order of decreasing $U_{i,j}$ from highest $U_{i,j}$ to lowest $U_{i,j}$).

Step 502 selects the first logical path on the list (i.e., the logical path having the highest usage value $U_{i,j}$) for which transmitting the most recently received data from the first provider edge PE1 108 to the second provider edge PE2 110 does not result in the selected logical path managing a higher percentage of the network traffic than its usage value $U_{i,j}$.

Step 503 transmits the most recently received data from the first provider edge PE1 108 to the second provider edge PE2 110 via the logical path selected from the list.

In one embodiment of the present invention, step 410 is completed after a period of time established by the end user. In an alternative embodiment of the present invention, step 410 is completed after a pre-defined fixed period of time not being established by the end user. In another alternative embodiment of the present invention, step 410 is completed after a specific number of paths have been exhausted, the specific number being provided by the end user.

After completion of step 410, the method continues with step 412 which comprises determining whether to recalculate all network paths. In one embodiment of the present invention, step 412 identifies whether data is received by the first provider edge PE1 108 requiring transmission to the second provider edge PE2 110. If the first provider edge PE1 108 continues to receive data, step 412 returns a response of 'yes' and the method returns to step 408 to perform steps 408 through 412 again. However, if the first provider edge PE2

108 does not continue to receive data, step 412 returns a response of 'no' and the method ends.

In an alternative embodiment of the present invention, step 412 identifies whether data is currently being transmitted across the first network 102. If data is actively/currently being transmitted across the first network 102, step 412 returns a response of 'yes' and the method returns to step 408 to perform steps 408 through 412 again. However, if no data is actively/currently being transmitted across the first network 102, step 412 returns a response of 'no' and the method ends.

In one embodiment of the present invention, the method 400 is applied specifically to a multiprotocol label switching network. The MPLS network comprises provider edges (PEs) as well as provider routers (Ps). Furthermore the MPLS comprises, inter alia, a control plane and a data plane.

The control plane in turn comprises: routing protocols (i.e. label discovery protocol or LDP; interior gateway protocol or IGP, etc.); a label information base (LIB) which contains label switched paths (LSPs); and a generic internet protocol service level agreement (IP SLA) engine to measure latency, jitter, and packet loss across the LSP.

The data plane utilizes the result of the control plane's calculations and IP SLA measurements to load balance traffic from the incoming provider edge (PE) to the outgoing provider edge (PE) across the multiple LSP.

As already mentioned, in an alternate embodiment, a networking based application recognition mechanism is used in conjunction with the load sharing algorithm of the present invention. Preferably, this mechanism is an IP NBAR feature as well known by those skilled in the art. This component allows the PE to recognize the application originating the traffic received from the CE (the end customer part of the network). Additionally, a centralized database grouping the traffic requirements by application is accessible by all MPLS PEs of the service provider. And using a client/server request mechanism, on a per on-demand basis, each PE requests the centralized database and receives each specific traffic requirements (delay, loss of packets, jitter).

On an incoming IP traffic, the ingress PE first attempts to recognize the application originating the traffic using the networking based application recognition mechanism. This feature enables recognition of an application based on some specific traffic details such as the Layer 4 TCP/UDP port couple or the Layer 5 first bytes payload.

Then the ingress PE determines the application traffic requirements by requesting them to the centralized database grouping the traffic requirements by application.

Based on the calculated IP SLAs, the ingress PE next determines if one or multiple MPLS LSP SLAs match the application traffic requirements.

Next, the ingress PE forwards the traffic to each matching LSP using the MPLS multiple LSP auto adaptable load sharing algorithm.

Figure 6:
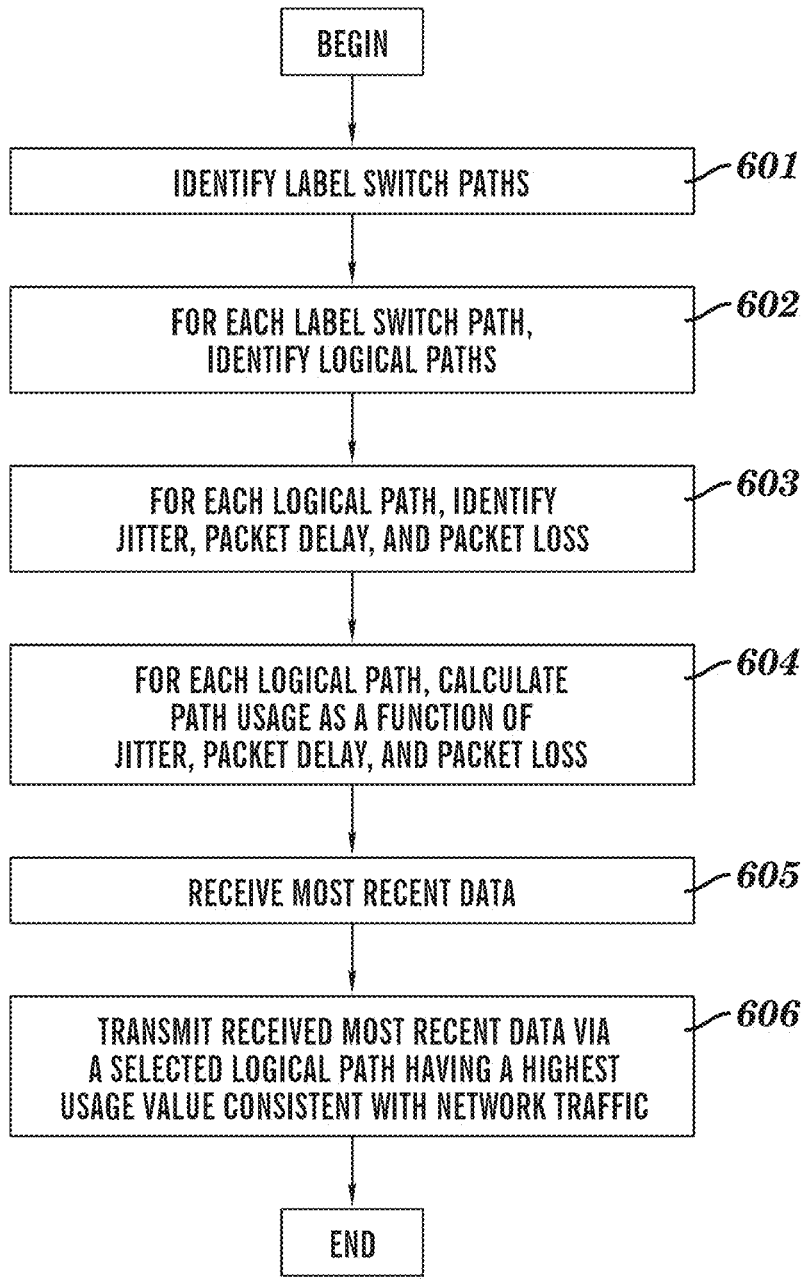
FIG. 6 is a flow chart describing a method for managing traffic in a network, in accordance with embodiments of the present invention.

FIG. 6 is a flow chart describing a method for managing traffic in a network, in accordance with embodiments of the present invention. The method of FIG. 6 comprises steps 601-606.

Step 601 identifies I label switch paths $P_i$ (i=1, 2, . . . , I), each label switch path $P_i$ beginning at a first provider edge and ending at a second provider edge, wherein the first provider edge and the second provider edge each reside in the network, and wherein I is a total number of paths in the network such that I is a positive integer of at least 2.

For each label switch path $P_i$ (i=1, 2, . . . , I), step 602 identifies J logical paths $LP_{i,j}$ (j=1, 2, . . . , J), wherein $J=2^N$ such that N is a positive integer of at least 2, and wherein said J logical paths for the I label switch paths consist of K logical paths such that K=I*J;

For each logical path $LP_{i,j}$ (i=1, 2, . . . , I and j=1, 2, . . . , J), step 603 identifies jitter $J_{i,j}$ and packet delay $D_{i,j}$ and packet loss $L_{i,j}$;

For each logical path $LP_{i,j}$ (i=1, 2, . . . , I and j=1, 2, . . . , J), step 604 calculates a path usage $U_{i,j}$ as a function of said $J_{i,j}$ and said $D_{i,j}$ and said $L_{i,j}$, wherein $U_{i,j}$ is a fraction denoting a highest percentage of total network traffic that logical path $LP_{i,j}$ can manage;

In step 605, the first provider edge receives most recent data.

Step 606 transmits said received most recent data from the first provider edge to the second provider edge via a select logical path of the K logical path such that the selected logical path comprises a highest path usage for which said transmitting said received most recent data does not result in the selected logical path managing a higher percentage of network traffic than is dictated by said highest usage value comprised by said selected logical path.

Figure 7:
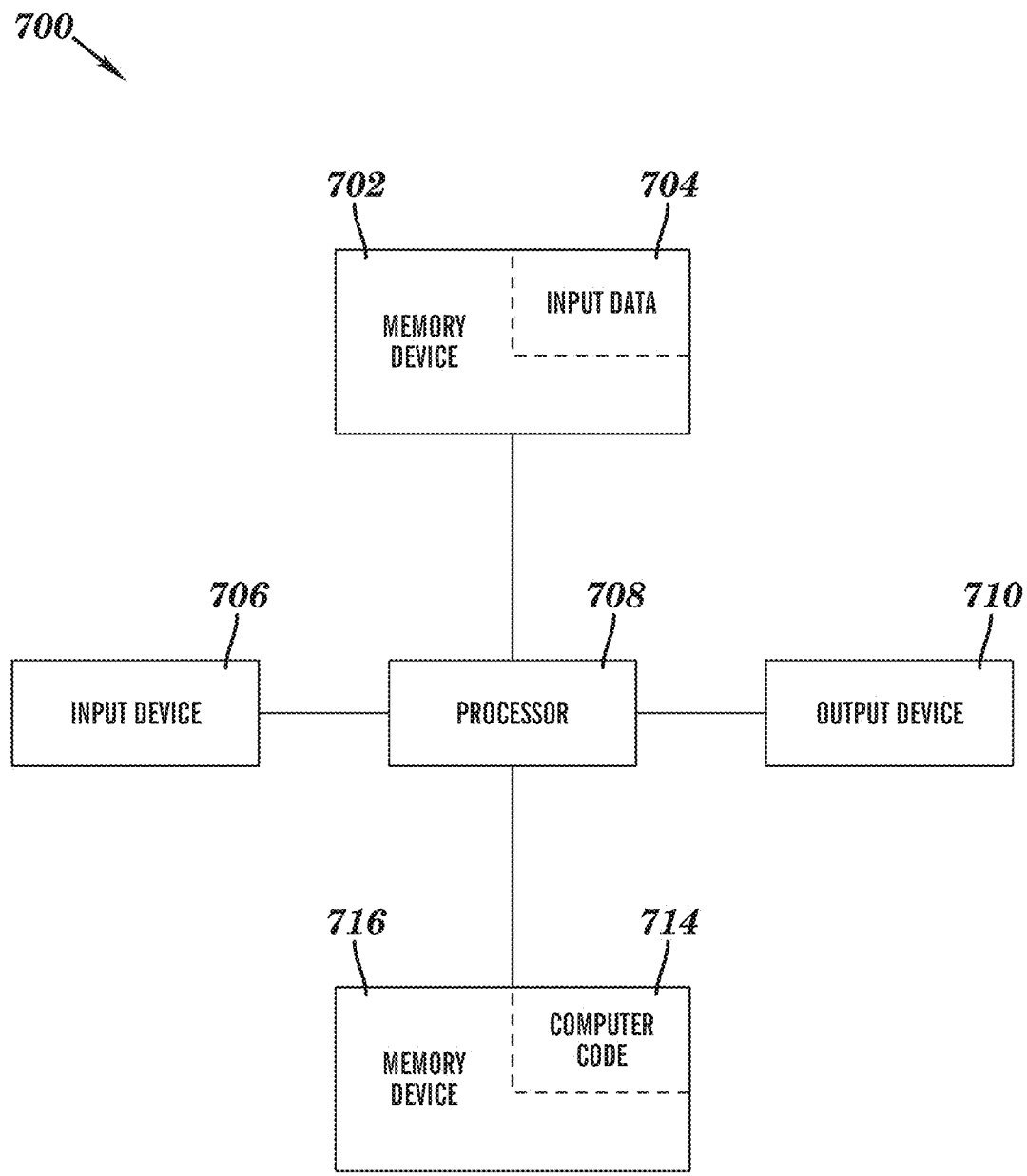
FIG. 7 illustrates a computer system which may facilitate a method for implementing adaptive load sharing to balance network traffic, in accordance with embodiments of the present invention.

FIG. 7 illustrates a computer system 700 which facilitates a method for implementing adaptive load sharing to balance network traffic, in accordance with embodiments of the present invention.

The computer system 700 comprises a processor 708, an input device 706 coupled to the processor 708, an output device 710 coupled to the processor 708, and memory devices 702 and 712 each coupled to the processor 708.

The input device 706 may be, a keyboard, a mouse, a keypad, a touch screen, a voice recognition device, a sensor, a network interface card (NIC), a Voice/video over Internet Protocol (VOIP) adapter, a wireless adapter, a telephone adapter, a dedicated circuit adapter, etc.

The output device 710 may be, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

The memory devices 702 and 712 may be a cache, a dynamic random access memory (DRAM), a read-only memory (ROM), a hard disk, a floppy disk, a magnetic tape, an optical storage such as a compact disc (CD) or a digital video disc (DVD), etc. The memory device 712 includes a computer code 714 which is a computer program that comprises computer-readable instructions.

The computer code 714 includes an algorithm used for implementing adaptive load sharing to balance network traffic according to the present invention. The processor 708 executes the computer code 714. The memory device 702 includes input data 704. The input data 704 includes input required by the computer code 714. The output device 710 displays output from the computer code 714. Either or both memory devices 702 and 712 (or one or more additional memory devices not shown in FIG. 7) may be used as a computer readable storage medium (or a computer readable medium or a program storage device) comprising physical matter and having a computer readable program embodied therein and/or having other data stored therein, wherein the computer readable program comprises the computer code 714. Generally, a computer program product (or, alternatively, an article of manufacture) of the computer system 700 may comprise said computer readable storage medium (or said program storage device).

Any of the components of the present invention can be deployed, managed, serviced, etc. by a service provider that offers to deploy or integrate computing infrastructure with respect to a process for implementing adaptive load sharing to balance network traffic. Thus, the present invention discloses a process for supporting computer infrastructure, comprising integrating, hosting, maintaining and deploying computer-readable code into a computing system (e.g., computing system 700), wherein the code in combination with the computing system is capable of performing a method for implementing adaptive load sharing to balance network traffic.

In a commercial application, a service provider, such as a Solution Integrator, can offer to create, maintain, support, etc. a networking computer infrastructure for operating the present invention of adaptive load sharing to balance network traffic.

While FIG. 7 shows the computer system 700 as a particular configuration of hardware and software, any configuration of hardware and software, as would be known to a person of ordinary skill in the art, may be utilized for the purposes stated supra in conjunction with the particular computer system 700 of FIG. 7. For example, the memory devices 702 and 712 may be portions of a single memory device rather than separate memory devices. In addition, in one embodiment of the present invention the computer system 700 may resemble a network router (i.e. provider edge router) and facilitate a method for implementing adaptive load sharing to balance network traffic.

The present invention is a low cost implementation solution, which is not CPU intensive and which does not require huge memory size as there is no mapping done between the traditional IP QOS parameters (DSCP, precedence, TOS) and the EXP values. The present invention has EXP setting without the need of an IP QOS/EXP mapping table.

While particular embodiments of the present invention have been described herein for purposes of illustration, many modifications and changes will become apparent to those skilled in the art. Accordingly, the appended claims are intended to encompass all such modifications and changes as falling within the true spirit and scope of this invention.

What is claimed is:

1. A method for managing traffic in a network, said method comprising:
   identifying, by a processor of a computer system, I label switch paths $P_i$ (i=1, 2, ..., I), each label switch path $P_i$ beginning at a first provider edge and ending at a second provider edge, wherein the first provider edge and the second provider edge each reside in the network, and wherein I is a total number of paths in the network such that I is a positive integer of at least 2;
   for each label switch path $P_i$ (i=1, 2, ..., I), said processor identifying J logical paths $LP_{i,j}$ (j=1, 2, ..., J), wherein $J=2^N$ such that N is a positive integer of at least 2, wherein said J logical paths for the I label switch paths consist of K logical paths such that K=I*J, and wherein each logical path of the K logical paths begins at the first provider edge and ends at the second provider edge;
   said processor transmitting most recent data received from the first provider edge to the second provider edge via a selected logical path of the K logical paths;
   for each logical path $LP_{i,j}$ (i=1, 2, ..., I and j=1, 2, ..., J), said processor identifying jitter $J_{i,j}$ and packet delay $D_{i,j}$ and packet loss $L_{i,j}$; and
   for each logical path $LP_{i,j}$ (i=1, 2, ..., I and j=1, 2, ..., J), said processor calculating a path usage $U_{i,j}$ as a first function of said $J_{i,j}$ and said $D_{i,j}$ and said $L_{i,j}$, wherein $U_{i,j}$ is a fraction denoting a highest percentage of total network traffic that logical path $LP_{i,j}$ can manage.

2. The method of claim 1, wherein the selected logical path comprises a highest usage value for which said transmitting said received most recent data does not result in the selected logical path managing a higher percentage of network traffic than is dictated by said highest usage value comprised by said selected logical path.

3. The method of claim 1, wherein said calculating the path usage $U_{i,j}$ for each logical path $LP_{i,j}$ (i=1, 2, ..., I and j=1, 2, ..., J) comprises:
   calculating a path rate Ri,j as a second function of said $J_{i,j}$ and said $D_{i,j}$ and said $L_{i,j}$;
   calculating a weight per path ($W_{i,j}$) according to $$W_{i,j} = R_{i,j} \bigg/ \sum_{i=1,j=1}^{I,J} R_{i,j};$$

calculating a credit per path ($C_{i,j}$) according to $C_{i,j}=1/W_{i,j}$;
   calculating ($C_{i,j}$) according to $$U_{i,j} = C_{i,j} \bigg/ \sum_{i=1,j=1}^{I,J} R_{i,j}.$$

4. The method of claim 3,
   wherein $R_{i,j}$ is calculated according to $R_{i,j}=D_{i,j}*DN+J_{i,j}*JN+L_{i,j}*LN$; and
   wherein DN, JN, and JN are proportionality constants for calculating $R_{i,j}$.

5. The method of claim 4, wherein the method further comprises:
   said first provider edge receiving, via the processor, DN, JN, and JN as user input for said calculating $R_{i,j}$.

6. The method of claim 1, wherein said received most recent data that is transmitted via the selected logical path comprises a plurality of packets, wherein each packet comprises a header that includes an EXP field consisting of N bits, and wherein the value of the N bits in the EXP field is the value of j pertaining to the selected logical path.

7. The method of claim 1, said method further comprising:
   providing at least one support service for at least one of creating, integrating, hosting, maintaining, and deploying computer-readable program code in the computer system, said program code being executed by the processor to implement said identifying I label switch paths, said identifying J logical path, and said transmitting most recent data.

8. A computer program product, comprising a computer readable memory device having computer readable computer readable program code stored therein, said program code containing instructions that when executed by a processor of a computer system implement a method for managing traffic in a network, said method comprising:
   said processor identifying I label switch paths $P_i$ (i=1, 2, ..., I), each label switch path $P_i$ beginning at a first provider edge and ending at a second provider edge, wherein the first provider edge and the second provider edge each reside in the network, and wherein I is a total number of paths in the network such that I is a positive integer of at least 2;
   for each label switch path $P_i$ (i=1, 2, ..., I), said processor identifying J logical paths $LP_{i,j}$ (j=1, 2, ..., J), wherein $J=2^N$ such that N is a positive integer of at least 2, wherein said J logical paths for the I label switch paths consist of K logical paths such that K=I*J, and wherein each logical path of the K logical paths begins at the first provider edge and ends at the second provider edge;

said processor transmitting most recent data received from the first provider edge to the second provider edge via a selected logical path of the K logical paths;

for each logical path $LP_{i,j}$ (i=1, 2, ..., I and j=1, 2, ..., J), said processor identifying jitter $J_{i,j}$ packet delay $D_{i,j}$ and packet loss $L_{i,j}$; and for each logical path $LP_{i,j}$ (i=1, 2, ..., I and j=1, 2, ..., J), said processor calculating a path usage $U_{i,j}$ as a first function of said $J_{i,j}$ and said $D_{i,j}$ and said $L_{i,j}$, wherein $U_{i,j}$ is a fraction denoting a highest percentage of total network traffic that logical path $LP_{i,j}$ can manage.

9. The computer program product of claim 8, wherein the selected logical path comprises a highest usage value for which said transmitting said received most recent data does not result in the selected logical path managing a higher percentage of network traffic than is dictated by said highest usage value comprised by said selected logical path.

10. The computer program product of claim 8, wherein said calculating the path usage $U_{i,j}$ for each logical path $LP_{i,j}$ (i=1, 2, ..., I and j=1, 2, ..., J) comprises:

calculating a path rate Ri,j as a second function of said $J_{i,j}$ and said $D_{i,j}$ and said $L_{i,j}$;

calculating a weight per path ($W_{i,j}$) according to $$W_{i,j} = R_{i,j} \Big/ \sum_{i=1,j=1}^{I,J} R_{i,j};$$

calculating a credit per path ($C_{i,j}$) according to $C_{i,j}=1/W_{i,j}$;
calculating ($C_{i,j}$) according to $$U_{i,j} = C_{i,j} \Big/ \sum_{i=1,j=1}^{I,J} R_{i,j}.$$

11. The computer program product of claim 10,
wherein $R_{i,j}$ is calculated according to $R_{i,j}=D_{i,j}*DN+J_{i,j}*JN+L_{i,j}*LN$; and
wherein DN, JN, and JN are proportionality constants for calculating $R_{i,j}$.

12. The computer program product of claim 11, wherein the method further comprises:
said first provider edge receiving, via the processor, DN, JN, and JN as user input for said calculating $R_{i,j}$.

13. A computer system comprising a processor coupled to a computer-readable memory unit, said memory unit comprising program code, said program code comprising instruction that when executed by said processor, implement a method for managing traffic in a network, said method comprising:

said processor identifying I label switch paths $P_i$ (i=1, 2, ..., I), each label switch path $P_i$ beginning at a first provider edge and ending at a second provider edge, wherein the first provider edge and the second provider edge each reside in the network, and wherein I is a total number of paths in the network such that I is a positive integer of at least 2;

for each label switch path $P_i$ (i=1, 2, ..., I), said processor identifying J logical paths $LP_{i,j}$ (j=1, 2, ..., J), wherein $J=2^N$ such that N is a positive integer of at least 2, wherein said J logical paths for the I label switch paths consist of K logical paths such that K=I*J, and wherein each logical path of the K logical paths begins at the first provider edge and ends at the second provider edge;

said processor transmitting most recent data received from the first provider edge to the second provider edge via a selected logical path of the K logical paths;

for each logical path $LP_{i,j}$ (i=1, 2, ..., I and j=1, 2, ..., J), said processor identifying jitter J packet delay $D_{i,j}$ and packet loss $L_{i,j}$;

for each logical path $LP_{i,j}$ (i=1, 2, ..., I and j=1, 2, ..., J), said processor calculating a path usage $U_{i,j}$ as a first function of said $J_{i,j}$ and said $D_{i,j}$ and said $L_{i,j}$, wherein $U_{i,j}$ is a fraction denoting a highest percentage of total network traffic that logical path $LP_{i,j}$ can manage;

for each logical path $LP_{i,j}$ (i=1, 2, ..., I and j=1, 2, ..., J), said processor identifying jitter J packet delay $D_{i,j}$ and packet loss $L_{i,j}$; and for each logical path $LP_{i,j}$ (i=1, 2, ..., I and j=1, 2, ..., J), said processor calculating a path usage $U_{i,j}$ as a first function of said $J_{i,j}$ and said $D_{i,j}$ and said $L_{i,j}$, wherein $U_{i,j}$ is a fraction denoting a highest percentage of total network traffic that logical path $LP_{i,j}$ can manage.

14. The computer system of claim 13, wherein the selected logical path comprises a highest usage value for which said transmitting said received most recent data does not result in the selected logical path managing a higher percentage of network traffic than is dictated by said highest usage value comprised by said selected logical path.

15. The computer system of claim 13, wherein said calculating the path usage $U_{i,j}$ for each logical path $LP_{i,j}$ (i=1, 2, ..., I and j=1, 2, ..., J) comprises:

calculating a path rate Ri,j as a second function of said $J_{i,j}$ and said $D_{i,j}$ and said $L_{i,j}$;

calculating a weight per path ($W_{i,j}$) according to $$W_{i,j} = R_{i,j} \Big/ \sum_{i=1,j=1}^{I,J} R_{i,j};$$

calculating a credit per path ($C_{i,j}$) according to $C_{i,j}=1/W_{i,j}$;
calculating ($C_{i,j}$) according to $$U_{i,j} = C_{i,j} \Big/ \sum_{i=1,j=1}^{I,J} R_{i,j}.$$

16. The computer system of claim 15,
wherein $R_{i,j}$ is calculated according to $R_{i,j}=D_{i,j}*DN+J_{i,j}*JN+L_{i,j}*LN$; and
wherein DN, JN, and JN are proportionality constants for calculating $R_{i,j}$.

17. The computer system of claim 16, wherein the method further comprises:
said first provider edge receiving, via the processor, DN, JN, and JN as user input for said calculating $R_{i,j}$.

* * * * *